(12) United States Patent
Loudon et al.

(10) Patent No.: US 6,588,859 B2
(45) Date of Patent: Jul. 8, 2003

(54) SYSTEM AND METHOD FOR VEHICLE STABILITY ENHANCEMENT CONTROL WITH SURFACE ESTIMATE

(75) Inventors: Steven P. Loudon, Howell, MI (US); Eric E. Krueger, Ann Arbor, MI (US); Julien Guiet, Paris (FR); Michael J. Check, Ann Arbor, MI (US)

(73) Assignee: Delphi Technologies, Inc., Troy, MI (US)

( * ) Notice: Subject to any disclaimer, the term of this patent is extended or adjusted under 35 U.S.C. 154(b) by 0 days.

(21) Appl. No.: 09/932,836

(22) Filed: Aug. 17, 2001

(65) Prior Publication Data

US 2003/0062768 A1 Apr. 3, 2003

(51) Int. Cl.⁷ .............................. B60T 8/24; B60T 8/60
(52) U.S. Cl. ........................................ 303/146; 303/140
(58) Field of Search ................................. 303/139, 140, 303/147, 146

(56) References Cited

U.S. PATENT DOCUMENTS

| | | | | |
|---|---|---|---|---|
| 5,229,944 A | * | 7/1993 | Yasuno | 303/146 |
| 5,667,286 A | * | 9/1997 | Hoying et al. | 303/140 |
| 5,720,533 A | * | 2/1998 | Pastor et al. | 303/140 |
| 5,732,379 A | * | 3/1998 | Eckert et al. | 303/140 |
| 5,862,503 A | * | 1/1999 | Eckert et al. | 303/140 |
| 5,941,919 A | * | 8/1999 | Pastor et al. | 303/140 |

\* cited by examiner

*Primary Examiner*—Jack Lavinder
*Assistant Examiner*—Robert A. Siconolfi
(74) *Attorney, Agent, or Firm*—Scott A. McBain (57) ABSTRACT

A system and method of vehicle stability enhancement control the method comprising the steps of determining a Delta Velocity of the vehicle, determining one of an understeer and an oversteer condition of the vehicle, applying a percentage of the Delta Velocity to an outside front and an outside rear wheel in the oversteer condition, and applying a percentage of the Delta Velocity to an inside front and an inside rear wheel in the understeer condition. The system and method may further comprise the step of applying the Delta Velocity to a rear wheel during the oversteer condition or applying the Delta Velocity to a front wheel during the understeer condition using fluid pressure from a master cylinder when braking is occurring.

25 Claims, 4 Drawing Sheets

SYSTEM AND METHOD FOR VEHICLE STABILITY ENHANCEMENT CONTROL WITH SURFACE ESTIMATE

TECHNICAL FIELD

This invention relates generally to the field of control of antilock braking for vehicles, and in particular, to a system and method for vehicle stability enhancement control during vehicle operation.

BACKGROUND OF THE INVENTION

Vehicle stability enhancement (VSE) has become more common on vehicles. VSE has been traditionally performed by applying brake pressure to one wheel, conventionally the front wheel on the outside of the turn if the vehicle is oversteering, and the rear wheel on the inside of the turn if the vehicle is understeering. VSE reduces vehicle spins and excessive understeer, reducing the difference between the driver's requested direction and the actual vehicle direction. VSE uses various sensors to look at the difference between the driver's requested direction and the yaw rate, and then manages individual wheel braking to bring the vehicle back toward the driver's requested direction. However, in order to achieve the required corrective action with only one wheel, the brake pressure apply must be aggressive, which causes the vehicle pitch and roll to be apparent to the driver. At high vehicle speeds, it is possible to reach a point where corrective action applied to only one wheel may not provide enough yaw correction to stabilize the vehicle.

During maneuvers performed at or close to the limit of adhesion, vehicle lateral dynamics are strongly influenced by the surface coefficient of adhesion. In order to achieve satisfactory vehicular performance under all road conditions, a control algorithm should provide adaptation to the surface coefficient of adhesion.

Accordingly, it would be desirable to have a system and method of vehicle stability enhancement control that allows making VSE more effective at high speeds and making the corrective action more comfortable to the driver while attaining the necessary level of control and determining and applying an optimum amount of force for a given surface.

SUMMARY OF THE INVENTION

One aspect of the invention provides a method of vehicle stability enhancement control for determining a Delta Velocity of the vehicle, determining one of an understeer and an oversteer condition of the vehicle, applying a percentage of the Delta Velocity to an outside front and an outside rear wheel in the oversteer condition, and applying a percentage of the Delta Velocity to an inside front and an inside rear wheel in the understeer condition.

Another aspect of the invention provides a method for applying the Delta Velocity to a rear wheel during the oversteer condition using fluid pressure from a master cylinder when braking is occurring.

Still another aspect of the invention provides a method for applying the Delta Velocity to a front wheel during the understeer condition using fluid pressure from a master cylinder when braking is occurring.

Another aspect of the present invention provides a method for applying the Delta Velocity to a rear wheel during the oversteer condition using an isolated hydraulic circuit when braking is not occurring.

Another aspect of the present invention provides a method for applying the Delta Velocity to a front wheel during the understeer condition using an isolated hydraulic circuit when braking is not occurring.

The invention provides the foregoing and other features, and the advantages of the invention will become further apparent from the following detailed description of the presently preferred embodiments, read in conjunction with the accompanying drawings. The detailed description and drawings are merely illustrative of the invention and do not limit the scope of the invention, which is defined by the appended claims and equivalents thereof.

DETAILED DESCRIPTION OF THE PRESENTLY PREFERRED EMBODIMENTS

Figure 1:
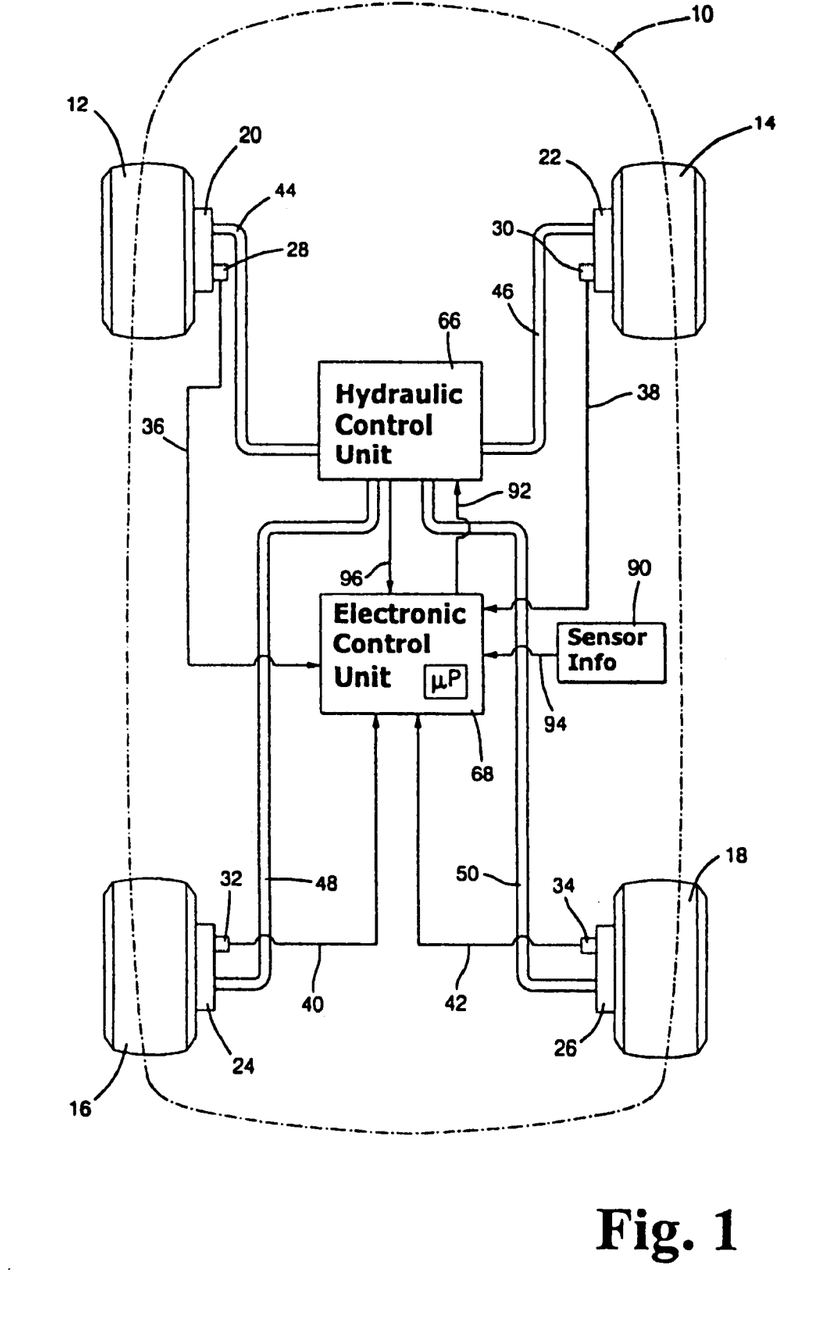
FIG. 1 is a schematic of one embodiment of a system for vehicle stability enhancement control that is made in accordance with the invention.

FIG. 1 is a schematic of a system for vehicle stability enhancement control during ABS operation. Vehicle 10 has wheels 12, 14, 16, and 18 with respective wheel speed sensors 28, 30, 32, and 34. The wheel speed sensors 28, 30, 32, and 34 send respective wheel speed signals 36, 38, 40, and 42 to electronic control unit 68. The electronic control unit 68 may be a computer, microcomputer, or microprocessor, with ROM and RAM and appropriate input and output circuits.

Besides the wheel speed signals 36, 38, 40, and 42, the electronic control unit 68 also receives sensor signals 94 from sensor information 90. Various sensor information 90, including yaw rate, steering wheel position, lateral acceleration, master cylinder pressure, and brake pedal position, may be used to establish vehicle status and surface coefficient of adhesion at the electronic control unit 68 as required by ABS, vehicle stability enhancement (VSE), or traction control systems. The electronic control unit 68 may also receive HCU feedback signal 96 from hydraulic control unit 66.

The electronic control unit 68 is responsive to and processes the wheel speed signals 36, 38, 40, and 42, the sensor signals 94, and the HCU feedback signal 96. The electronic control unit 68 determines the proper ABS state to optimize vehicle braking and sends control signal 92 to the hydraulic control unit 66. The hydraulic control unit 66 uses the control signal 92 to determine brake pressure signals 44, 46, 48, and 50, which control pressure to respective brakes 20, 22, 24, and 26 for the respective wheels 12, 14, 16, and 18. The hydraulic control unit 66 typically comprises pressure control pumps and solenoid operated actuating valves to rapidly change the brake pressure signals 44, 46, 48, and 50.

A method for determining an estimation of surface coefficient of adhesion between the vehicle and a surface is disclosed in pending U.S. patent application Ser. No. 09/769,676, assigned to the assignee of the present invention, the disclosure of which is hereby incorporated, in its entirety, by reference.

Figure 2:
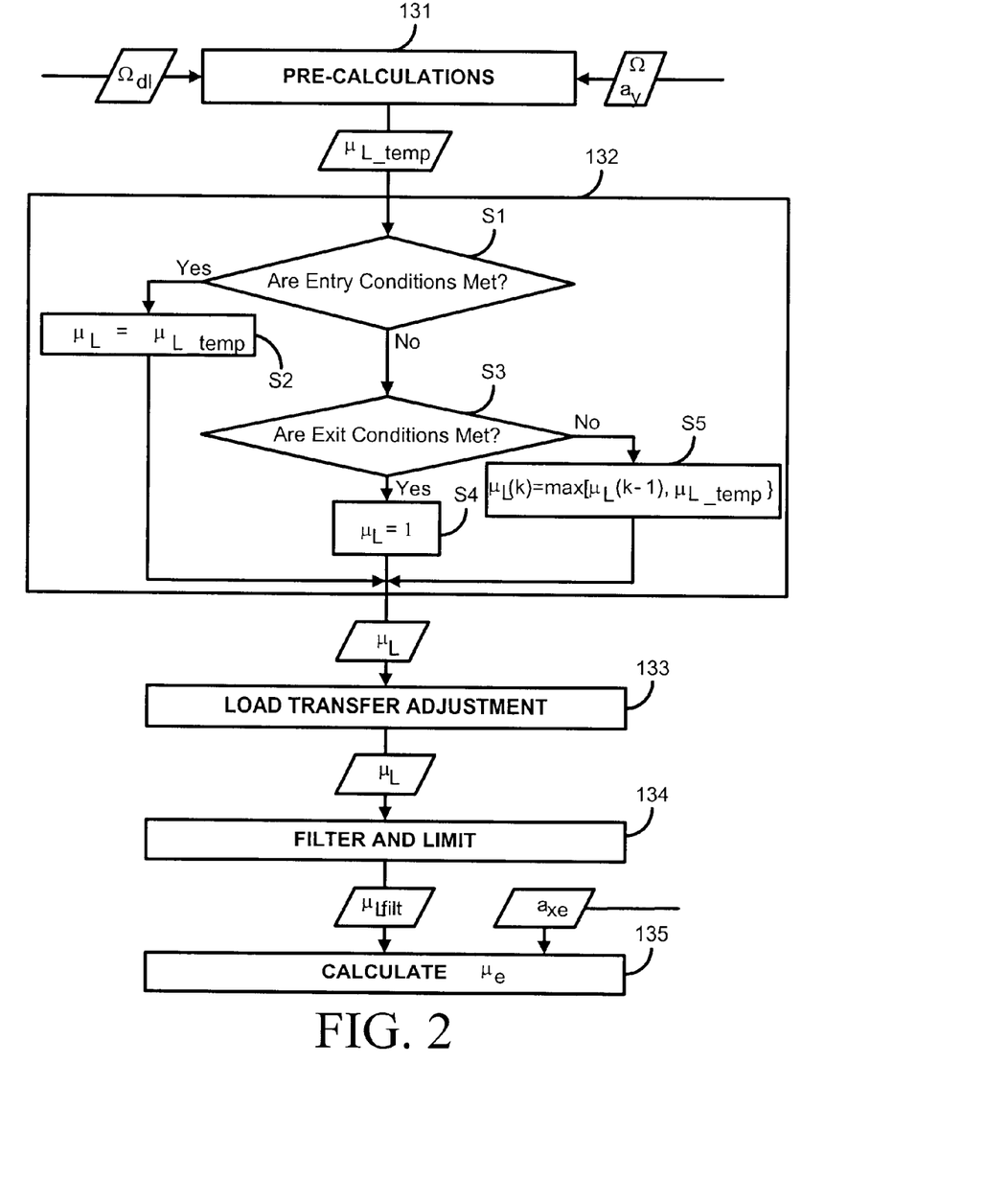
FIG. 2 is a flow chart of one embodiment of estimating a surface coefficient of adhesion.

Referring to FIG. 2, an embodiment of one function of the electronic control unit 68 (shown in FIG. 1) is shown, directed to estimating surface coefficient of adhesion $\mu_e$.

The surface coefficient estimate (an estimate of the coefficient of friction of the road surface is used along vehicle speed to determine the optimal split of brake pressure between the two controlled wheels (outside or inside). Maneuvers on a low coefficient surface that involve the correction of, oversteer, require pressure application on the outside wheels. Due to the fact that the outside rear wheel is the wheel with the greatest lateral grip on the rear axle, applying too much brake pressure will cause the lateral grip to be reduced, thus causing more oversteer. On these surfaces the brake pressure applied to the rear wheel should be limited. During understeer correction, the system must also limit the pressure applied to the inside front wheel. This is because braking the front wheel excessively can cause the vehicle to lose lateral grip, causing increased understeer.

Maneuvers on a high coefficient surface that involve the correction of oversteer allow a greater portion of the desired correction action to be applied to the rear wheel. This is beneficial for increasing greater comfort while still applying the same corrective action to achieve the desired effect. Also, at higher speeds, it allows the system to apply greater overall corrective action and can be achieved with only one wheel. This allows the system to obtain more effective understeer control. For a vehicle having a front weight bias, when the vehicle is in a high lateral acceleration corner, the normal force on the inside of the wheel is greatly reduced due to side-to-side weight transfer. During this condition, distributing the control between the front and rear inside wheel greatly increases the corrective yaw moment that can be achieved.

In respect to calculating an estimate of the coefficient of friction of the road surface a block 131 performs preliminary calculations. First, it is recognized that the most robust signal available is yaw rate $\Omega$, and an entry and an exit conditions are dependent mainly on a yaw rate error, i.e. a difference between the desired yaw rate $\Omega_{dl}$ and measured yaw rate $\Omega$, and to a lesser extent on measured lateral acceleration $a_y$ (entry condition only). Thus, a yaw rate error is calculated and filtered, and lateral acceleration $a_y$ is filtered.

Second, when vehicle 10 (FIG. 1) reaches the limit of adhesion in a steady turn, a surface coefficient of adhesion can be determined as a ratio of the magnitude of a filtered lateral acceleration $a_{yfilt}$ to a maximum lateral acceleration $a_{ymax}$ that vehicle 10 can sustain on dry pavement as shown in the following equation (1):

$$\mu_{L\_temp} = |a_{yfilt}|/a_{ymax} \quad (1)$$

where $\mu_{L\_temp}$ is a temporary estimate of surface coefficient of adhesion in the lateral direction, and $a_{yfilt}$ is filtered lateral acceleration, which is also corrected for the effects of measured gravity components resulting from vehicle body roll and bank angle of the road.

A block 132 is designed to recognize situations when vehicle 10 operates at or close to the limit of adhesion and estimates a lateral surface coefficient of adhesion $\mu_L$ from measured lateral acceleration $a_y$. This estimate is calculated by identifying one of the following three conditions.

First, entry conditions are tested during a stage S1. Entry conditions are when vehicle 10 is handling at the limit of adhesion and is not in a quick transient maneuver. Under entry conditions, stage S2 sets coefficient of adhesion $\mu_L$ equal to temporary estimate of surface coefficient of adhesion $\mu_{L\_temp}$ as calculated by equation (2).

$$\Omega_{dl} = \begin{cases} \Omega_d & \text{if } |\Omega_d| \leq (|a_y| + \Delta a_y)/v_x \\ [(|a_y| + \Delta a_y)/v_x] * \text{sign}(\Omega_d) & \text{if } |\Omega_d| > (|a_y| + \Delta a_y)/v_x \end{cases} \quad (2)$$

where $\Delta a_y$ is a constant positive value, for example 2 m/s². The magnitude of desired lateral velocity $v_{yd}$ is limited by the value obtained from equation (3)

$$\Omega_{dmax} = g/v_x \quad (3)$$

(where g is acceleration of gravity), with the desired yaw rate at steady state $\Omega_{dss}$ replaced by the limited desired yaw rate $\Omega_{dl}$.

Second, exit conditions are tested during a stage S3. Exit conditions indicate vehicle 10 is well below the limit of adhesion (within the linear range of handling behavior). Under exit conditions, a stage S4 resets coefficient of adhesion $\mu_L$ to a default value of 1.

Third, when neither the entry conditions nor the exit conditions are met, a stage S5 holds coefficient of adhesion $\mu_L$ unchanged from a previous value (i.e. holding conditions). The only exception is when the magnitude of measured lateral acceleration $a_y$ exceeds the maximum value predicted using currently held estimate. In this case, stage S5 calculates coefficient of adhesion $\mu_L$ as if vehicle 10 was in an entry condition.

The entry conditions are met during stage S1 when the following three (3) conditions are simultaneously satisfied. The first condition is either (1) the magnitude of the yaw rate error, that is the difference between the desired yaw rate $\Omega_d$ and the measured yaw rate $\Omega$ being greater than a threshold as computed in the following equation (4):

$$|\Omega_d - \Omega|_{filt} > Yaw\_Threshold1 \quad (4)$$

where the typical value of Yaw_Thershold1 is 0.123 rad/s=7 deg/s); or (2) the magnitude of yaw rate error being greater than a lower threshold Yaw_Threshold2 for some time Te as computed in the following equation (5):

$$|\Omega_d - \Omega|_{filt} > Yaw\_Threshold2 \text{ for Te seconds} \quad (5)$$

where Yaw_Threshold2 depends on the magnitude of desired yaw rate $\Omega_d$ or measured yaw rate $\Omega$. For example, Yaw_Threshold2=4 deg/s+5*$|\Omega_d|$=0.07 rad/s+0.09*$|\Omega_d|$, where $\Omega_d$ is the desired yaw rate in [rad/s]. A typical value of the time period Te for which this condition must be satisfied is 0.3 sec. The threshold Yaw_Threshold1 used in equation (4) may also depend on the magnitude of desired yaw rate $\Omega_d$ or measured yaw rate $\Omega$.

The second condition is the signs of the filtered lateral acceleration $a_{yfilt}$ and the weighted sum of yaw rate $\Omega$ and the derivative of yaw rate are the same in accordance with the following mathematical expression (6):

$$a_{yfilt} * (\Omega + Yaw\_Der\_Mult * d\Omega/dt) > Sign\_Comp \quad (6)$$

where $\Omega$ is the measured yaw rate and $d\Omega/dt$ is its derivative. The magnitude of the filtered lateral acceleration $a_{yfilt}$ is limited from equation (7):

$$a_{yfilt} = \begin{cases} a_{yfilt1} & \text{if } |a_{yfilt}| \geq a_{ymin} \\ a_{ymin} * \text{sign}(\Omega_d) & \text{if } |a_{yfilt}| < a_{ymin} \end{cases} \quad (7)$$

where $a_{ymin}$ is a constant with a typical value of 0.2 m/s². Thus if $a_{yfilt}$ is very small in magnitude, it is replaced by the $a_{ymin}$ with a sign the same as the desired yaw rate $\Omega_d$. This limit is needed to improve estimation on very slick surfaces (e.g. ice) when the magnitude of lateral acceleration $a_y$ is comparable to the effect of noise, so that the sign of $a_{yfilt}$ cannot be established.

The recommended values in equation (6) for the constant Yaw_Der_Mult is 0.5 and for Sign_Comp is 0.035 (if $\Omega$ is in rad/s and $d\Omega/dt$ in rad/s$^2$).

In order to allow lateral acceleration $a_y$ to fully build up at the beginning of maneuver and after each change in sign, before it can be used for estimation of surface coefficient $\mu_L$, a condition is used that requires both the desired yaw rate $\Omega_d$ and lateral acceleration $a_y$ to have the same signs for a specific time period (necessary for the acceleration to build up). In order to keep track of how long the desired yaw rate $\Omega_d$ and lateral acceleration $a_y$ have had the same signs, a timer is introduced. In accordance with an equation (8), the timer becomes zero when the desired yaw rate $\Omega_d$ and lateral acceleration $a_y$ have opposite signs and counts the time that elapses from the moment the signs become and remain the same.

$$\text{timer} = \begin{cases} 0 & \text{when } \Omega_d * a_{yfilt} < \text{Ay\_sign\_comp} \\ \text{timer} + \text{loop\_time} & \text{otherwise} \end{cases} \quad (8)$$

where $\Omega_d$ is the desired yaw rate in [rad/s] and Ay_sign_comp is a constant with a typical value of 0.2 m/s$^3$.

The third condition is either (1) the signs of the desired yaw rate $\Omega_d$ and measured lateral acceleration $a_y$ are the same and they have been the same for some time in accordance with following equation (9):

$$\text{timer} > \text{hold\_time} \quad (9)$$

The hold_time in equation (6) can be 0.25 s, or (2) the magnitude of a derivative of lateral acceleration $da_y/dt$ is less than a threshold in accordance with the following mathematical equation (10):

$$|da_y/dt| < \text{Ay\_Der\_Thresh} \quad (10)$$

A recommended value of the threshold, Ay_Der_Thresh= 2.5 m/s$^3$. The derivative $da_y/dt$ is obtained by passing filtered lateral acceleration $a_{yfil}$ through a high pass filter with a transfer function $a_f * s/(s+a_f)$ with a typical value of $a_f=6$ rad/s.

The exit conditions are met during stage S3 when the following two (2) conditions are simultaneously satisfied. The first condition is the magnitude of yaw rate error filtered is less than or equal to a threshold as illustrated in the following equation (11):

$$|\Omega_d - \Omega|_{filt} \leq \text{Yaw\_Threshold3} \quad (11)$$

with a typical value of Yaw_Threshold3=0.10 rad/s.

The second condition is a low-pass filtered version of the magnitude of the yaw rate error is less than or equal to a threshold as illustrated in the following equation (12):

$$(|\Omega_d - \Omega|_{filt})_{filt} \leq \text{Yaw\_Treshold4} \quad (12)$$

where the value of Yaw_Threshold4=0.06 rad/s is recommended and the filter is a first order filter with a cutoff frequency of 1.8 rad/s, e.g. a filter with a transfer function $a_f/(s+a_f)$ with $a_f=1.8$ rad/s). The thresholds Yaw_Threshold3 and Yaw_Thereshold4 may depend on the magnitude of desired yaw rate $\Omega_d$ or the measured yaw rate $\Omega$.

A block 133 corrects surface estimate $\mu_L$ for load transfer. Because of the effects of load transfer to the outside tires during cornering, which is smaller on slippery surfaces than on dry roads, lateral acceleration $a_y$ is not directly proportional to the surface coefficient of adhesion $\mu_L$. To account for this effect, the surface estimate $\mu_{L\_temp}$ computed from equation (2), is corrected using the following equation (13):

$$\mu_L = \mu_{L\_temp} * (c_1 + c_2 * \mu_{L\_temp}) \quad (13)$$

where $c_1 < 1$ and $c_2 = 1 - c_1$, so that on dry surface $\mu_L = \mu_{L\_temp} = 1$, while on slippery surfaces $\mu_L < \mu_{L\_temp}$. Example values are $c_1 = 0.85$ and $c_2 = 0.15$.

A block 134 limits surface estimate $\mu_L$ from below by a value $\mu_{Lmin}$ (a typical value 0.07) and may be limited from above by $\mu_{Lmax}$ (a typical value 1.2). Surface estimate $\mu_L$ can be passed through a slew filter, which limits the rate of change of the estimate to a specified value, for example 2/sec, or a low pass filter.

A block 135 estimates total surface coefficient of adhesion $\mu_e$ using the following equation (14):

$$\mu_e = \begin{cases} \mu_{Lfilt} & \text{when } |a_{xe}| \leq \text{Ax\_Dz} \\ \{(\mu_{Lfilt})^2 + [(|a_{xe}| - \text{Ax\_DZ})/a_{xmax}]^2\}^{1/2} & \text{when } |a_{xe}| > \text{Ax\_Dz} \end{cases} \quad (14)$$

where Ax_Dz is the dead-zone applied to the estimated longitudinal acceleration (a typical value is 2 m/s$^2$) and $a_{xmax}$ is a maximum longitudinal deceleration which vehicle 10 can achieve on dry surface (a typical value is 9 m/s$^2$). The square root function in the above expression can be replaced by a simplified linear equation or by a look-up table. The estimate is finally limited from below by $\mu_{emin}$ (typical value is 0.2) and from above by $\mu_{emax}$ (1.0).

The (unfiltered) estimate of surface coefficient in lateral direction, $\mu_L$, was found to be good for estimation of vehicle sideslip angle. However, for control purposes, the estimate of the surface coefficient in lateral direction may be too low in some situations (for example during heavy braking on slick surfaces) and may cause unnecessary tight control of slip angle. Therefore, for the purpose of control the estimated surface coefficient is increased when the magnitude of the estimated vehicle longitudinal acceleration exceeds certain value. Note that separate thresholds on yaw rate error for the entry and exit conditions are used, with the thresholds on the exit conditions being a little tighter.

Figure 3:
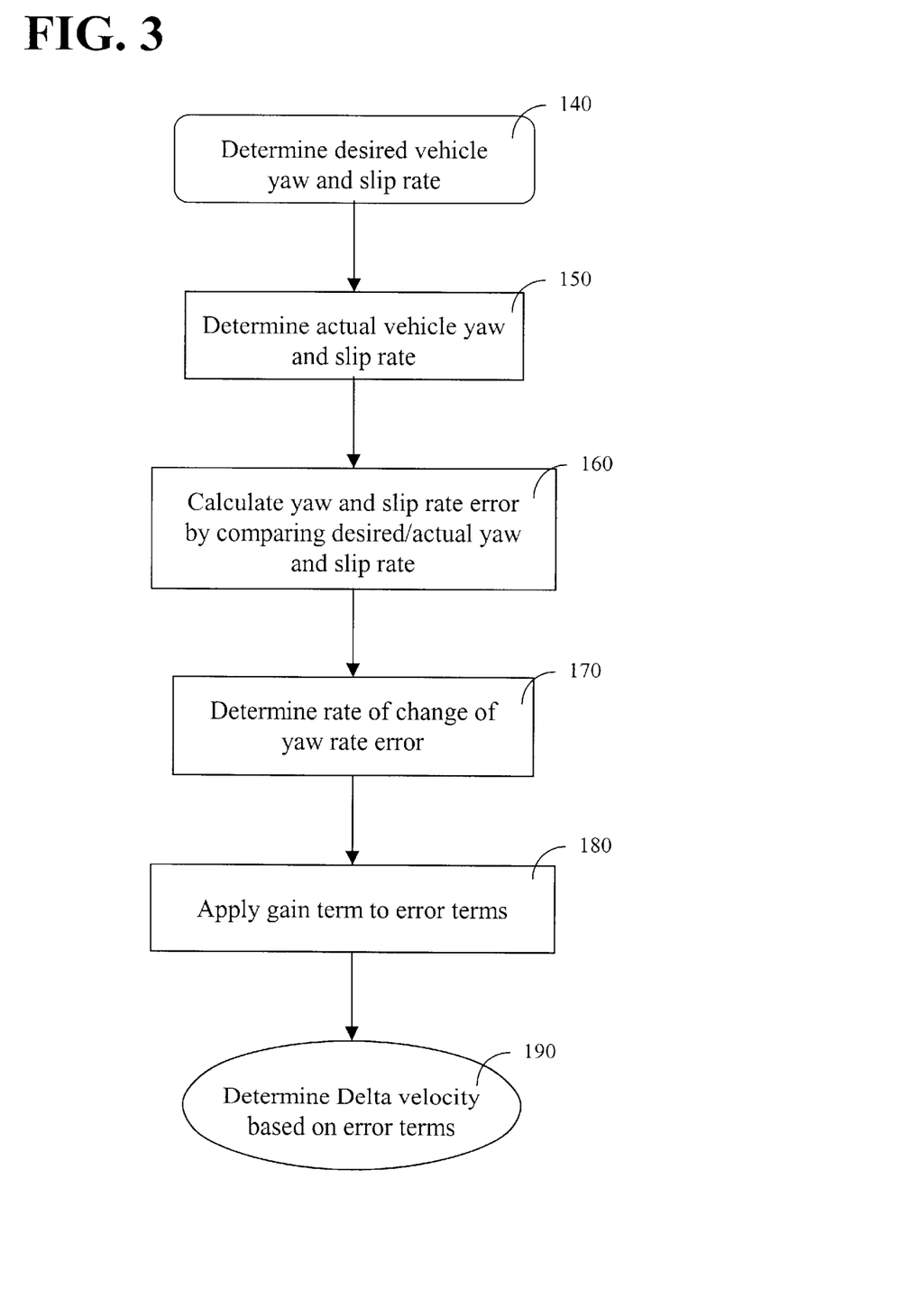
FIG. 3 is a flow chart of one embodiment of a method of determining a Delta Velocity for use in vehicle stability enhancement control with surface estimate that is made in accordance with the invention.

FIG. 3 illustrates one embodiment of a generalized method of determining a Delta Velocity ($DV_{LR}$) for use in making VSE more effective and comfortable for a driver of a vehicle. The method includes determining a desired vehicle yaw rate and a desired vehicle slip rate in block 140. A determination is made of the actual vehicle yaw and slip rate in block 150. A yaw rate error and slip rate error is calculated by comparing the desired yaw and slip rate and the actual yaw and slip rate in block 160. A time derivative of the change or yaw rate error may be calculated to provide a third error term in block 170. A gain value is applied to the two error terms from block 160 determine $DV_{LR}$ in block 180. This may be performed by using a gain value taken from lookup tables based on vehicle speed and the surface estimate (FIG. 2). Preferably, the $DV_{LR}$ uses the error terms (increased by the determined gain), added to the time derivative of the yaw rate error, minus the sideslip error to calculate the $DV_{LR}$.

Figure 4:
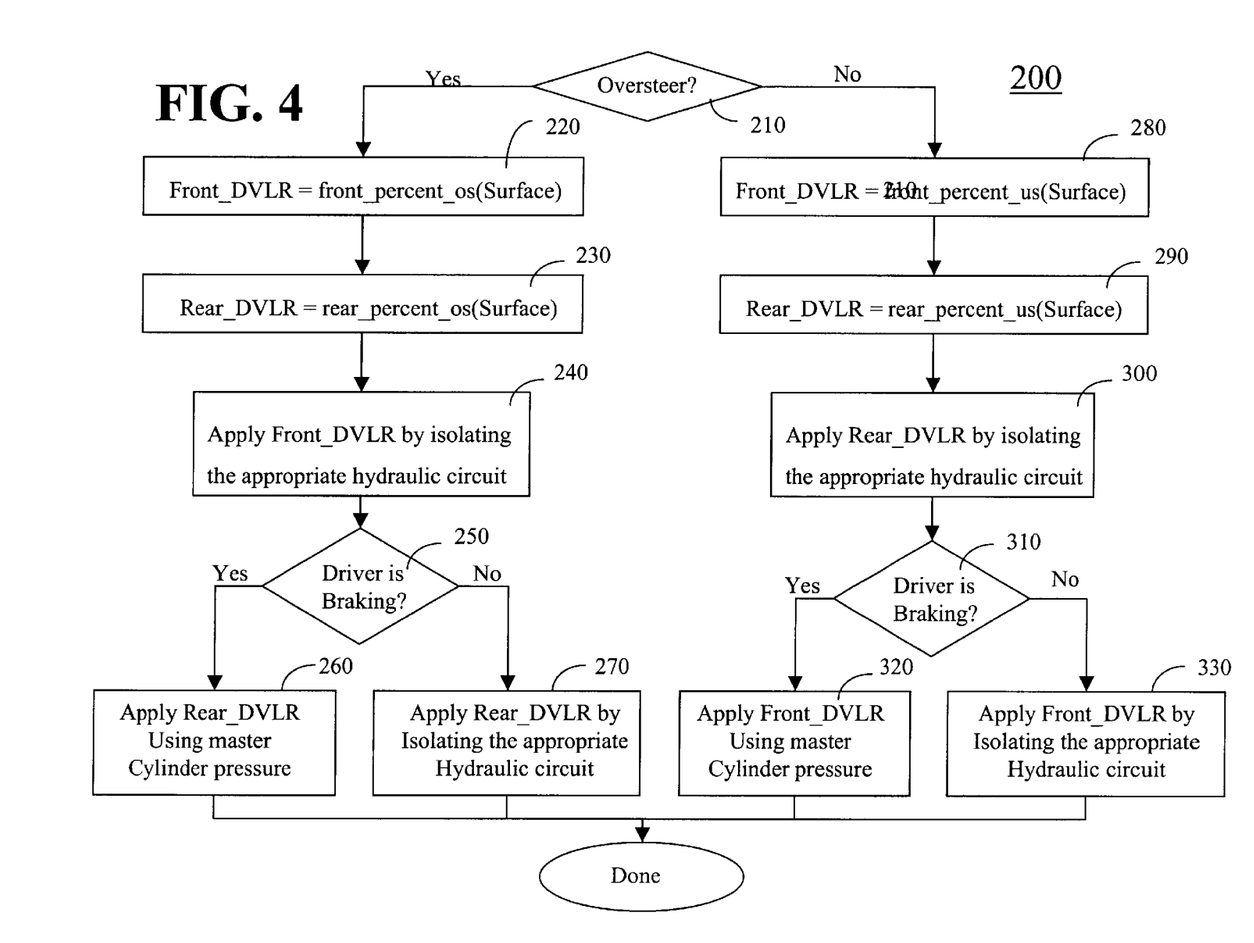
FIG. 4 is a flow chart of one embodiment of a method of determining a Delta Velocity for use in vehicle stability enhancement control with surface estimate that is made in accordance with the invention.

FIG. 4 is a flow chart of one embodiment of a method of vehicle stability enhancement control using a $DV_{LR}$ including an estimation of surface coefficient. Programmed circuits, such as microcomputers, microprocessors, etc., or discrete components, can be used to carry out the method. The method of the invention allows VSE to be more effective, especially at high vehicle speeds by dividing, modulating or partitioning brake application across two wheels, i.e., two inside wheels in an understeer condition or two outside wheels for oversteer). It has been found that such VSE corrections reduce the pitch of the vehicle during, for example, oversteer control.

Generally, the implementation of the invention occurs by taking the Delta Velocity command determined during operation of the vehicle and applying a percentage of the Delta Velocity to one of the front wheels and a percentage to one of the rear wheels. Methods to determine Delta Velocity are known in the art. An example is provided by U.S. Pat. No. 5,720,533, assigned to the assignee of this invention, and incorporated herein by reference. For purposes of the present invention, it will be understood that the determination of Delta Velocity including a surface adhesion estimate can be done by any suitable method. As summarized in FIG. 3, without wishing to be limited, the determination of Delta Velocity can be performed by comparing a desired yaw rate and a desired slip rate to a calculated yaw rate and actual slip rate to obtain a yaw rate error and a slip rate error. A gain value or values are applied to the error values. The Delta Velocity may be based on the gain applied yaw rate error and the slip rate error. The method of the invention takes the generated Delta Velocity and applies a percentage to one of the front wheels and a percentage to one of the rear wheels to provide VSE. As illustrated in the below examples for both the oversteer and understeer situations (See Tables 1–4), the sum of the percentages applied may not sum to 100 percent of the generated Delta Velocity. As illustrated, the percentage applied may be greater than or less than 100 percent.

The vehicle stability enhancement system may apply to two wheels simultaneously, while not under braking. During an oversteer maneuver, the wheels on the outside of the term are used, and during an understanding of the wheels and inside turn are used. This allows improved the vehicle stabilities into larger corrective moment can be applied using two wheels as opposed to one. Vehicle pitch and roll can be reduced since the control action is divided between two wheels, and the amounts and rate of pressure applied can be lessened (and harshness appeared to the driver reduced) since the pressure is divided between two wheels. The method of the invention also allows assistant to generate greater overall corrective action that increases the range of stability events that can be corrected.

Under braking, only one hydraulic channel is isolated. This is due to the fact that all cars are provided with two separate hydraulic circuits and that the driver must be permitted to apply brake pressure to the brake system. In one embodiment, a first circuit provides hydraulic pressure to the front wheels and the second circuit provides hydraulic pressure to the rear wheels. In another version, the first circuit provides hydraulic fluid to one of the front wheels and one of the rear wheels located on an opposite side with respect to the front wheel. The second circuit provides hydraulic fluid pressure to the diagonal opposites with respect to the first pair of wheels. Due to this design fact, the system may apply pressure to only one wheel, since the pressure at the wheel on the non-isolated circuit cannot be increased over the pressure produced by the driver through the master cylinder. However since the pressure at the wheel is known, its share of the total vehicle control action to be accounted for and the controlled wheel can have the appropriate amount of pressure applied to it.

As is known, the control system 68 (FIG. 1) may determine if VSE is required. A VSE modification term can be calculated by a VSE algorithm, which tries to match the driver's requested direction and the yaw rate and/or slip rate, as discussed above. The VSE modification term corresponds to a velocity difference (Delta Velocity) that VSE wants to create across the axle to stabilize the vehicle.

Referring to FIG. 4, a method for a two-wheel VSE apply algorithm is illustrated generally at 200. A determination is made based on information from sensor information 90 whether the vehicle is experiencing an oversteer (or understeer) condition at block 210. If the vehicle is experiencing an oversteer condition, a front wheel supply percentage is determined at block 220 by accessing a lookup table for the Front left/right Delta Velocity ($DV_{LR}$). This determination is made including the estimation of surface coefficient to achieve the optimal amount of force for a given surface. The percentages are applied to Delta Velocity and used to create front target velocities separate from the rear target velocities for the wheels to be controlled. An exemplary table is illustrated in Table 1 for an oversteer front wheel lookup table, block 220, where the lateral force includes the surface estimate and the vector percent represents the percentage applied of $DV_{LR}$.

TABLE 1

| Lateral Force (G) | Vector Percent |
|---|---|
| 0.00 | 0.9 |
| 0.25 | 0.825 |
| 0.50 | 0.75 |
| 0.75 | 0.675 |
| 1.00 | 0.6 |

It can be seen that a high percent of pressure is provided to the front outside wheel during an oversteer condition where the lateral force is low and remains over 50% when the lateral force is high.

Similarly, a vector rear percent (oversteer condition) is determined in block 230 by a look up table Rear $DV_{LR}$ as shown in Table 2.

TABLE 2

| Lateral Force (G) | Vector Percent |
|---|---|
| 0.00 | 0.2 |
| 0.25 | 0.3 |
| 0.50 | 0.4 |
| 0.75 | 0.5 |
| 1.00 | 0.6 |

In this table the outside rear wheel pressure is kept low during oversteer when the lateral force is low and is raised to over 50% during high lateral force.

The system isolates the appropriate hydraulic circuit to apply the determined $DV_{LR}$ to the front wheel at block 240. The system determines if the driver is braking, i.e., providing a brake command at block 250. If the driver is braking, the system applies the rear $DV_{LR}$ using master cylinder pressure at block 260. In the alternate scenario, i.e., if the driver is not braking, the system applies the rear $DV_{LR}$ by isolating the appropriate hydraulic circuit at block 270.

If the vehicle is not in an oversteer condition, a vector front percent (understeer condition) is determined in block 280 by a look up table Front $DV_{LR}$ as shown in Table 3 below.

TABLE 3

| Lateral Force (G) | Vector Percent |
| --- | --- |
| 0.00 | 0.3 |
| 0.25 | 0.4 |
| 0.50 | 0.5 |
| 0.75 | 0.6 |
| 1.00 | 0.7 |

It can be seen that as the lateral force increases the vector percent of $DV_{LR}$ increases to the front inside wheel.

If the vehicle is not in an oversteer condition, a vector rear percent (understeer condition) is determined in block 290 by a look up table Rear $DV_{LR}$ as shown in Table 4 below.

TABLE 4

| Lateral Force (G) | Vector Percent |
| --- | --- |
| 0.00 | 0.6 |
| 0.25 | 0.6 |
| 0.50 | 0.6 |
| 0.75 | 0.6 |
| 1.00 | 0.6 |

It can be seen that in the understeer condition that the vector percent of $DV_{LR}$ remains constant regardless of lateral acceleration.

The system isolates the appropriate hydraulic circuit to apply the determined $DV_{LR}$ to the rear wheel at block 300. The system determines if the driver is braking, i.e., providing a brake command, at block 310. If the driver is braking, the system applies the front $DV_{LR}$ using master cylinder pressure at block 320. In the alternate scenario, i.e., if the driver is not braking, the system applies the front $DV_{LR}$ by isolating the appropriate hydraulic circuit at block 330.

Although the steps of the embodiment above are presented in the preferred order, the steps may be completed in different orders. The steps of determining yaw and slip rates, determining whether the brakes are being applied, applying pressure to front and rear wheels and so on, may be carried out in any order and by any suitable method.

While the embodiments of the invention disclosed herein are presently considered to be preferred, various changes and modifications can be made without departing from the spirit and scope of the invention. The scope of the invention is indicated in the appended claims, and all changes that come within the meaning and range of equivalents are intended to be embraced therein.

What is claimed is:

1. A method for determining vehicle stability enhancement control comprising:

determining a Delta Velocity of the vehicle;

determining one of an understeer and an oversteer condition of the vehicle;

applying a percentage of the Delta Velocity to an outside front and an outside rear wheel in the oversteer condition; and applying a percentage of the Delta Velocity to an inside front and an inside rear wheel in the understeer condition, wherein the Delta Velocity includes a determination of surface adhesion estimate.

2. The method of claim 1 wherein Delta Velocity includes a yaw rate error term and slip rate error term.

3. The method of claim 1 further comprising:

applying the Delta Velocity to a rear wheel during the oversteer condition using fluid pressure from a master cylinder when braking is occurring.

4. The method of claim 1 further comprising:

applying the Delta Velocity to a rear wheel during the oversteer condition using an isolated hydraulic circuit when braking is not occurring.

5. The method of claim 1 further comprising:

applying the Delta Velocity to a front wheel during the understeer condition using fluid pressure from a master cylinder when braking is occurring.

6. The method of claim 1 further comprising:

applying the Delta Velocity to a front wheel during the understeer condition using an isolated hydraulic circuit when braking is not occurring.

7. The method of claim 1 wherein the Delta Velocity is proportioned corresponding to an estimate of surface coefficient.

8. The method of claim 7 wherein the Delta Velocity is proportioned between the affected front and rear wheel corresponding to whether the vehicle is experiencing one of a condition of understeer and oversteer.

9. The method of claim 8 wherein the proportions are selected from lookup tables, vector values of which are predetermined according to an estimate of surface coefficient.

10. The method of claim 9 wherein the applied percentage of the Delta Velocity to the outside front wheel decreases as the estimate of surface coefficient increases.

11. The method of claim 9 wherein the applied percentage of the Delta Velocity to the outside rear wheel increases as the estimate of surface coefficient increases.

12. The method of claim 9 wherein the applied percentage of the Delta Velocity to the inside front wheel increases as the estimate of surface coefficient increases.

13. The method of claim 9 wherein the applied percentage of the Delta Velocity to the inside front wheel remains constant as the lateral velocity increases.

14. A system for vehicle stability enhancement control comprising:

means for determining a Delta Velocity of the vehicle;

means for determining one of an understeer and an oversteer condition of the vehicle; means for applying a percentage of the Delta Velocity to an outside front and an outside rear wheel in the oversteer condition; and means for applying a percentage of the Delta Velocity to an inside front and an inside rear wheel in the understeer condition, wherein the Delta Velocity includes a determination of surface adhesion estimate.

15. The system of claim 14 further comprising:

means for applying the Delta Velocity to a rear wheel during the oversteer condition using fluid pressure from a master cylinder when braking is occurring.

16. The system of claim 14 further comprising:

means for applying the Delta Velocity to a rear wheel during the oversteer condition using an isolated hydraulic circuit when braking is not occurring.

17. The system of claim 14 further comprising:

means for applying the Delta Velocity to a front wheel during the understeer condition using fluid pressure from a master cylinder when braking is occurring.

18. The system of claim 14 further comprising:

means for applying the Delta Velocity to a front wheel during the understeer condition using an isolated hydraulic circuit when braking is not occurring.

19. A method for vehicle stability enhancement control comprising:

determining a Delta Velocity of the vehicle;

determining one of an understeer and an oversteer condition of the vehicle;

applying a percentage of the Delta Velocity to an outside front and an outside rear wheel in the oversteer condition; and applying a percentage of the Delta Velocity to an inside front and an inside rear wheel in the understeer condition, wherein the Delta Velocity is proportioned corresponding to an estimate of surface coefficient.

20. The method of claim 19 wherein the Delta Velocity is proportioned between the affected front and rear wheel corresponding to whether the vehicle is experiencing one of a condition of understeer and oversteer.

21. The method of claim 20 wherein the proportions are selected from lookup tables, vector values of which are predetermined according to an estimate of surface coefficient.

22. The method of claim 21 wherein the applied percentage of the Delta Velocity to the outside front wheel decreases as the estimate of surface coefficient increases.

23. The method of claim 21 wherein the applied percentage of the Delta Velocity to the outside rear wheel increases as the estimate of surface coefficient increases.

24. The method of claim 21 wherein the applied percentage of the Delta Velocity to the inside front wheel increases as the estimate of surface coefficient increases.

25. The method of claim 21 wherein the applied percentage of the Delta Velocity to the inside front wheel remains constant as the lateral velocity increases.

* * * * *